(12) United States Patent  (10) Patent No.: US 7,614,635 B2
Pelligrino  (45) Date of Patent: Nov. 10, 2009

(54) APPARATUS AND MEANS FOR REMOTELY LAUNCHING AND SECURELY RETRIEVING A TRAILERED WATERCRAFT

(75) Inventor: Paul A Pelligrino, Muskego, WI (US)

(73) Assignee: Pages, LLC, Muskego, WI (US)

( * ) Notice: Subject to any disclaimer, the term of this patent is extended or adjusted under 35 U.S.C. 154(b) by 258 days.

(21) Appl. No.: 11/779,225

(22) Filed: Jul. 17, 2007

(65) Prior Publication Data

US 2009/0020981 A1  Jan. 22, 2009

(51) Int. Cl.
*B60P 3/10* (2006.01)
(52) U.S. Cl. ............................. 280/414.1; 414/559
(58) Field of Classification Search ......... 280/414.1; 414/559
See application file for complete search history.

(56) References Cited

U.S. PATENT DOCUMENTS

| 3,263,845 | A | * | 8/1966 | Davidson | 414/559 |
|---|---|---|---|---|---|
| 3,357,581 | A | * | 12/1967 | Scott | 414/478 |
| 3,750,805 | A | | 8/1973 | Finney | |
| 3,831,790 | A | | 8/1974 | Farris | |
| 3,912,302 | A | | 10/1975 | Patterson | |
| 3,989,267 | A | | 11/1976 | Robinson | |
| 4,114,920 | A | | 9/1978 | Boettcher | |
| 4,463,965 | A | | 8/1984 | Lawson | |
| 4,623,161 | A | | 11/1986 | Sprague | |
| 4,626,162 | A | * | 12/1986 | Parisi | 414/479 |
| 4,641,851 | A | | 2/1987 | Knies | |
| 5,120,079 | A | | 6/1992 | Boggs | |
| 5,599,035 | A | | 2/1997 | Spence | |
| 5,895,185 | A | | 4/1999 | Spence | |
| 6,402,445 | B1 | | 6/2002 | Smiley | |
| 6,598,896 | B1 | | 7/2003 | Hyslop | |
| 7,179,041 | B2 | * | 2/2007 | Ebbenga | 414/494 |
| 7,380,809 | B2 | * | 6/2008 | McGinty et al. | 280/414.1 |
| 2004/0037686 | A1 | | 2/2004 | Zietlow et al. | |

FOREIGN PATENT DOCUMENTS

WO  WO 8705568 A1 * 9/1987

* cited by examiner

*Primary Examiner*—Kevin Hurley
(74) *Attorney, Agent, or Firm*—John K. McCormick

(57) ABSTRACT

A boat trailer modified to include a dolly and dolly track, the dolly including a hook triggering mechanism, a bow cradle and a slidable hooking mechanism for engaging a watercraft bow ring at a wide range misalignment with the centerline of the trailer. The trailer further including a remote controlled power winch with an automatic shut off for stopping the power winch when a watercraft is fully loaded. The invention enabling a single user to launch a securely retrieve a watercraft to and from a watercraft trailer.

5 Claims, 13 Drawing Sheets

APPARATUS AND MEANS FOR REMOTELY LAUNCHING AND SECURELY RETRIEVING A TRAILERED WATERCRAFT

TECHNICAL FIELD OF THE INVENTION

The present invention relates to trailered vehicles and trailers and more particularly to a trailer equipped with a means for a single person to remotely launch and securely retrieve a vehicle such as a boat, jet-ski or the like.

BACKGROUND OF THE INVENTION

Conventional watercraft trailers allow a user the convenience and pleasure of transporting a boat, jet ski or the like to a variety of locations for the enjoyment of the watercraft they are trailering. The trailer allows the watercraft being trailered to be securely and safely towed by a motorized vehicle from place to place. The trailer further permits the user to store the trailered watercraft safely in a garage or on the individual's own property without incurring additional storage expense. However, presently existing trailers have a variety of limitations which detract from their above noted conveniences.

In the case of watercraft trailers, the trailer is typically backed down a ramp that extends into the water such that the boat or jet ski can then be floated off of the trailer for launching the watercraft and driving the watercraft part way onto the trailer for retrieving the watercraft. Typically, the launching or retrieving of a watercraft requires two people, one person in the watercraft to secure and control the watercraft when the watercraft is in the water and another person to operate a winch mechanism during the launching and retrieval of the watercraft to and from a trailer.

In the retrieval of a watercraft, this problem is exacerbated by the fact that the trailer is at a downward angle of 10 degrees or greater due to the ramp the trailer is on while the watercraft is level on the water thereby resulting in having the bow of the watercraft at an angle different from the bow cradle bunks and latching mechanism of the trailer. Consequently, a user typically attaches a winch strap, attached to a winch on the trailer, to a bow ring in order to pull the watercraft into alignment with the trailer cradle bunks.

When there is a wind blowing or if there is turbulent water, aligning the watercraft to the trailer for retrieval becomes even more difficult as the watercraft tends to drift off of its original position for retrieval. In these situations, it is not unusual for the person operating the winch to have to wade into the water to assist in aligning the watercraft to the trailer and in connecting the winch line to the bow of the watercraft and further operating the winch to fully pull the watercraft into the proper position on the cradle bunks and onto the trailer.

Because of the need for the watercraft to be secured to the winch line for movement onto or off of a trailer, the watercraft operator must leave the cockpit of the watercraft to secure or release the winch line from the bow of the watercraft, thereby leaving the watercraft out of control for a period of time or necessitating a third person at the controls of the watercraft. Thus, the current means for the launching or retrieval of a watercraft, although greatly increasing the flexibility and pleasure offered to watercraft users, generally requires the cooperative efforts of two or more people to launch and/or retrieve the watercraft safely and securely.

Once on a trailer, a watercraft can then be secured with tie downs or the like to prevent movement and damage during transportation of the watercraft and trailer.

DESCRIPTION OF RELATED ART

U.S. Pat. No. 3,963,263 issued to Whitlock on Jun. 15, 1976 teaches an automatic boat latch, however, this latch does not provide an automatic release for use when launching a boat.

U.S. Pat. No. 3,831,790 issued to Farris on Aug. 27, 1974 teaches a kit comprising a wheeled carriage and rails adapted to be secured to a boat trailer for facilitating the loading and unloading of a boat by securing the forward end of a boat after engaging the bow of the boat but before releasing the catch previously engaged with the eye on the bow of the boat. However, this kit requires the use of the boats power to fully retrieve the boat to the trailer.

U.S. Pat. No. 3,750,805 issued to Finney on Aug. 7, 1973 teaches a wheeled dolly and track structure attached to a trailer for loading a boat to a boat trailer. However, this structure requires the use of the boat's power to fully retrieve the boat to the trailer.

U.S. Pat. Application Publication No. 2004/0037686 by Zietlow et al. teaches a boat trailer modified to include a load bearing trolley movable along a single track parallel to the length of the trailer. The trolley having an automatic latching and unlatching mechanism that operates depending upon the position of the trolley. However, the docking plate has limited movement relative to the bow of the watercraft and requires a flexible target antenna attached to the docking plate in order for the occupant to position the watercraft onto the docking plate accurately enough to engage the latching mechanism onto the bow ring.

None of the above inventions, taken either singly or taken in combination, is seen to describe the instant invention as claimed. Therefore, an improved trailer solving the aforementioned problems is desired.

SUMMARY OF THE INVENTION

The present invention is directed at an apparatus and means for automatically unloading and retrieving a vehicle to and from a trailer by a single individual. In addition, this invention allows a single user to retrieve a watercraft to a trailer with a substantial initial misalignment of the watercraft to the trailer and still easily and successfully retrieve and secure the watercraft to the trailer.

Other features and advantages of this disclosure will become apparent to one skilled in the art upon examination of the following drawings and detailed description. It is intended that all such additional features and advantages be included within the scope of the present invention.

Reference will now be made in detail to the description of the invention as illustrated in the drawings. Although the invention is described in connection with the drawings, there is no intent to limit the invention to the embodiment or embodiments disclosed therein. On the contrary, the intent is to include all alternatives, modifications, and equivalents included within the scope and spirit of the invention as defined by the appended claims.

BRIEF DESCRIPTION OF THE DRAWINGS

The present invention will be apparent to those skilled in the art by reading the following description of the preferred embodiments of the invention taken in conjunction with the attached drawings, which are only for illustration, and are thus not meant to be limiting the present invention, and in which.

DESCRIPTION OF THE PREFERRED EMBODIMENTS

Figure 1:
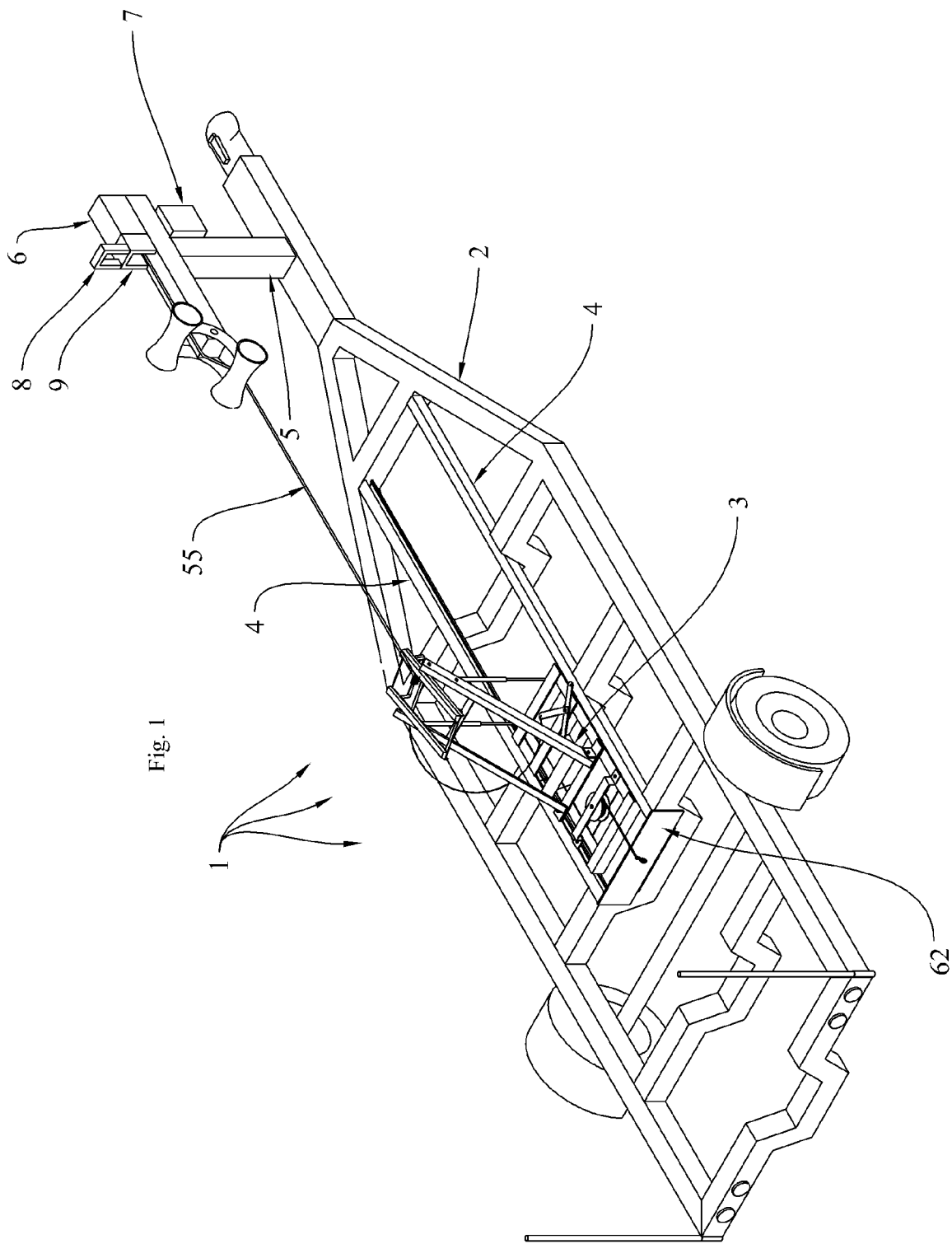
FIG. 1 is a perspective view of the subject boat launching and retrieving invention with the launching and retrieving apparatus in its most rearward position.
Figure 2:
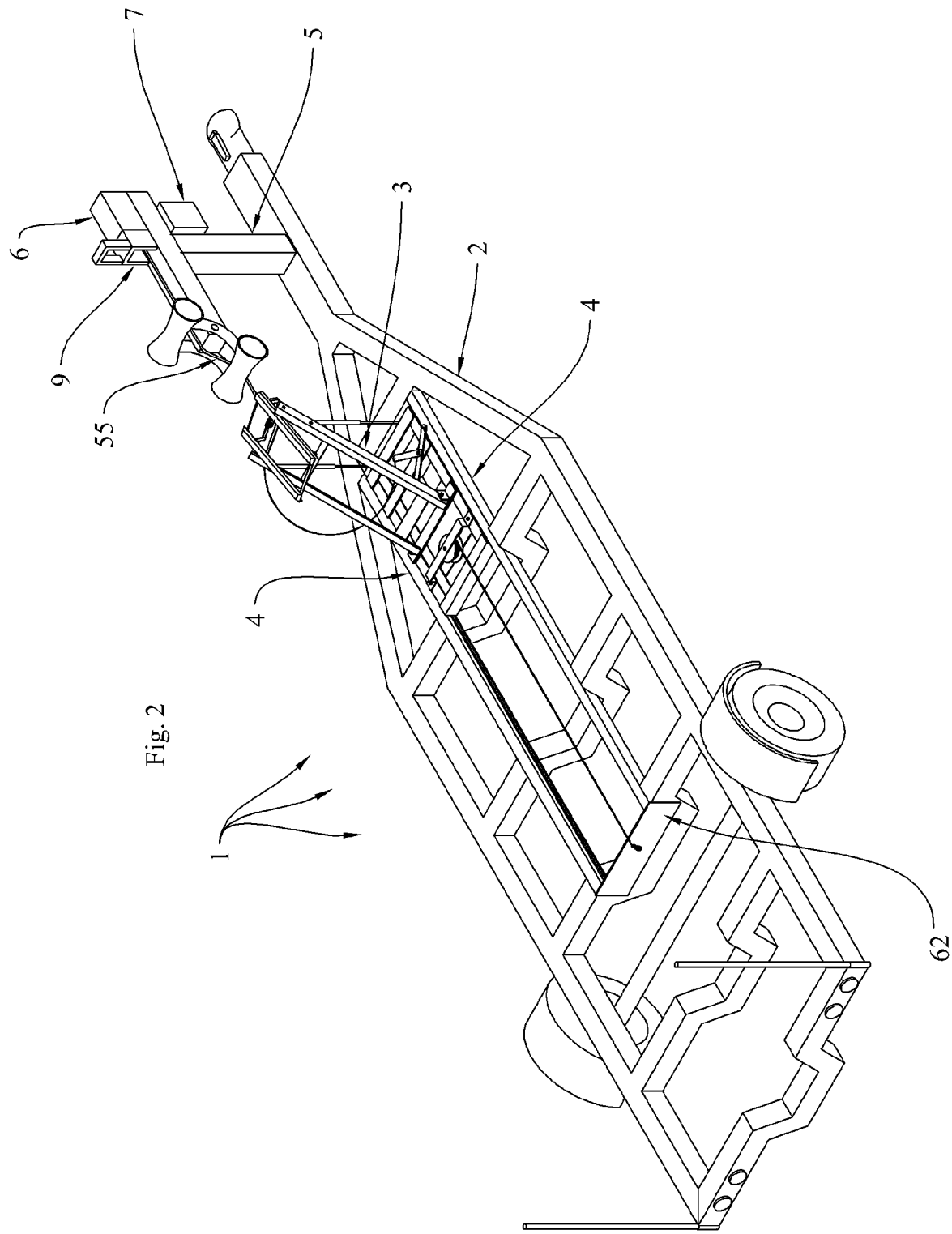
FIG. 2 is a perspective view of the subject boat launching and retrieving invention with the launching and retrieving apparatus in its most forward position.

FIG. 1 depicts the present invention 1 as installed on a watercraft trailer 2 with the dolly assembly 3 shown in its most rearward position. The watercraft trailer, as commonly known in the art, having longitudinal supports, a rear end, a plurality of trailer wheels disposed proximate the rear end of the of the supports. Hull support rollers or support boards, as are commonly known in the art, are not depicted in the figures as they would interfere with the drawings of the present invention. The dolly assembly 3 is movably retained between two dolly track rails 4 which are fixedly attached to the watercraft trailer 2. Toward the front of the trailer 2 is the post arm 5 to which is attached the power winch assembly 6, an electrical control box 7 and a combined power winch strap control device 9 with an automatic shutoff switch 8. FIG. 2 depicts the present invention 1 as installed on a watercraft trailer 2 with the dolly assembly 3 in its most forward position.

Figure 3:
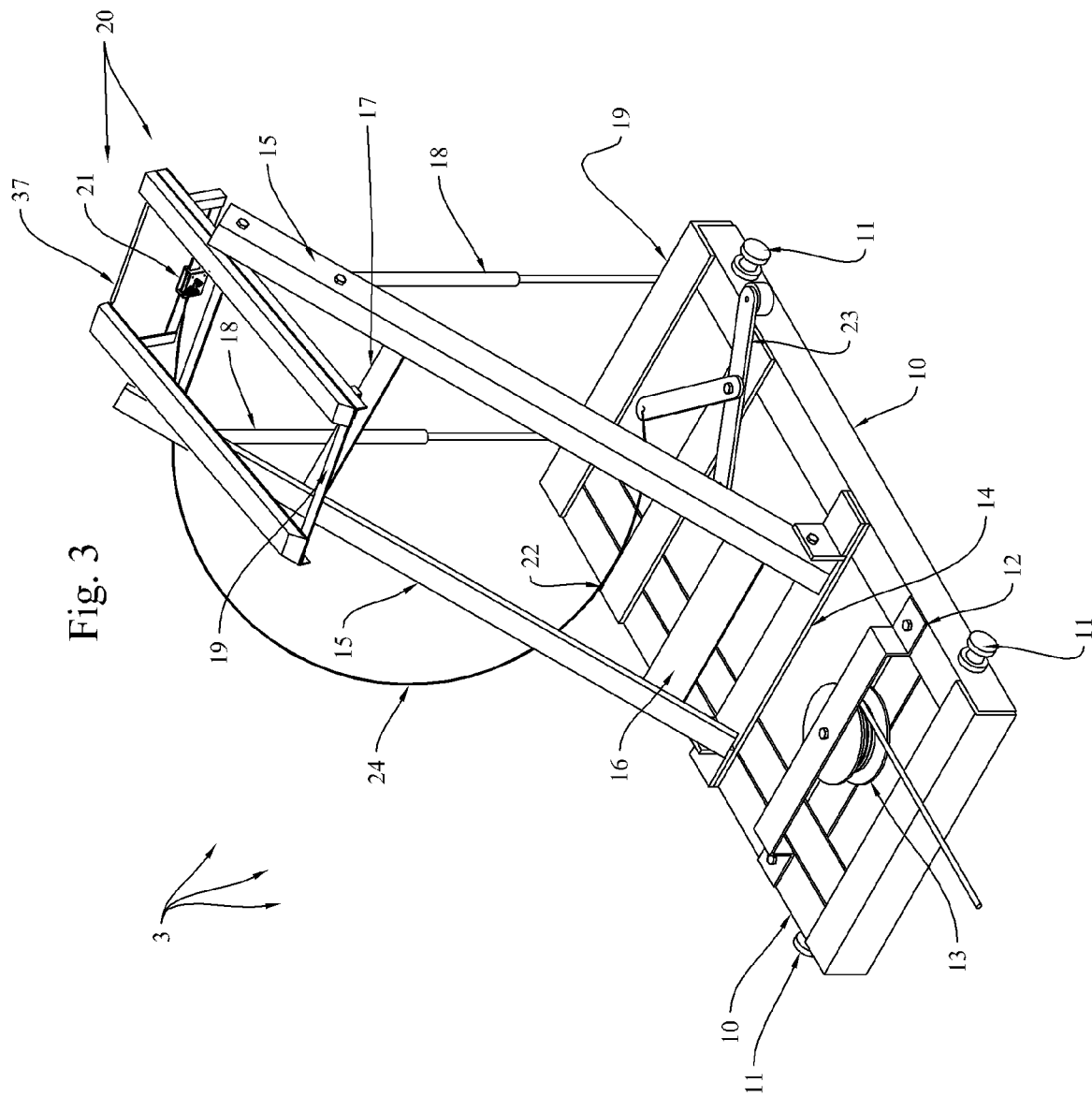
FIG. 3 is a perspective view of the dolly assembly of the present invention.

FIG. 3 is a perspective view of the dolly assembly 3. The dolly assembly comprises two dolly frame rails 10. Attached near each end of the dolly frame rails 10 on the outside edges are four (4) rotatable dolly guide wheels 11 (only three are depicted). At each end of the dolly assembly 3 are end support bars 61 and 19. Near the rear end support bar 61 is a first support bar 12 to which is mounted one (1) thirty pound constant tensioner cable wheel 13 that are well known in the art. The cable of the constant tensioner being attached at one end to the cable wheel 13 and at the other end to the rear of the dolly track rails 4 on the track strut 62 as shown in FIGS. 1 and 2. Towards the middle of the dolly frame rails 10 is mounted a second support bar 14 to which is pivotably attached two cradle frame rails 15, one cradle frame rail near each side of the dolly frame rails 10. Third and fourth support bars 16 and 17 connect the two cradle frame rails 15 for rigidity. Towards the upper ends of the cradle frame rails 15 are mounted two (2) sixty pound air shocks 18 with each air shock 18 being attached on a cradle frame rail 15 at a first end and to the forward end support bar 19 that is mounted to the front of the dolly frame rails 10 at the second end. At the upper end of the cradle frame rails 15 are pivotally mounted a bow cradle assembly 20 for receiving the bow of a boat. Attached to the forward end of the bow cradle assembly 20 is a hooking mechanism 21 for automatically engaging a bow hook into a bow ring attached to the bow of a boat (not shown). The hooking mechanism 21 and its operation will be described in greater detail below.

Attached to the dolly frame rails 10 between the second support bar 14 and the front end support bar 19 is a fifth support bar 22. Pivotally attached to the fifth support bar 22 is a spring biased triggering mechanism 23. A cable 24 is attached at a first end to the triggering mechanism 23 and at a second end to the hooking mechanism 21, the operation of which will be described in greater detail below.

Figure 4:
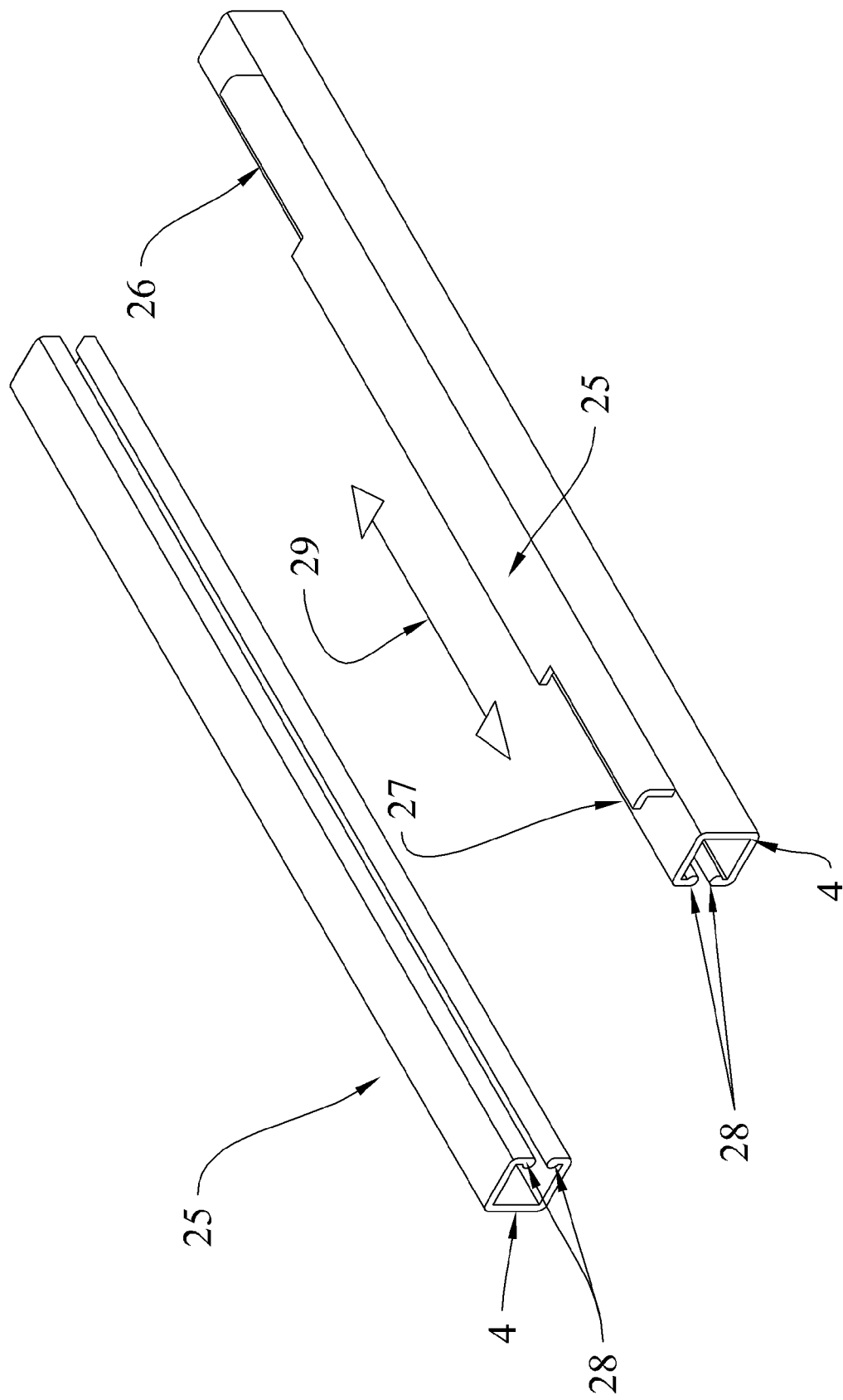
FIG. 4 is a perspective view of the dolly track rails and the position lever rail of the present invention.

FIG. 4 is a perspective view of the dolly track rails 4 with the position lever rail 25 fixedly attached to one of the dolly track rails 4. There are forward 26 and rearward 27 cutouts in the position lever rail 25 used for activating the hooking mechanism 21 as will be described later. The inside rolled edge 28 of the dolly track rails 4 is where the rotatable dolly guide wheels 11 operate moving in a backward and forward direction on the dolly track rails 4 as indicated by the arrow 29.

Figure 5:
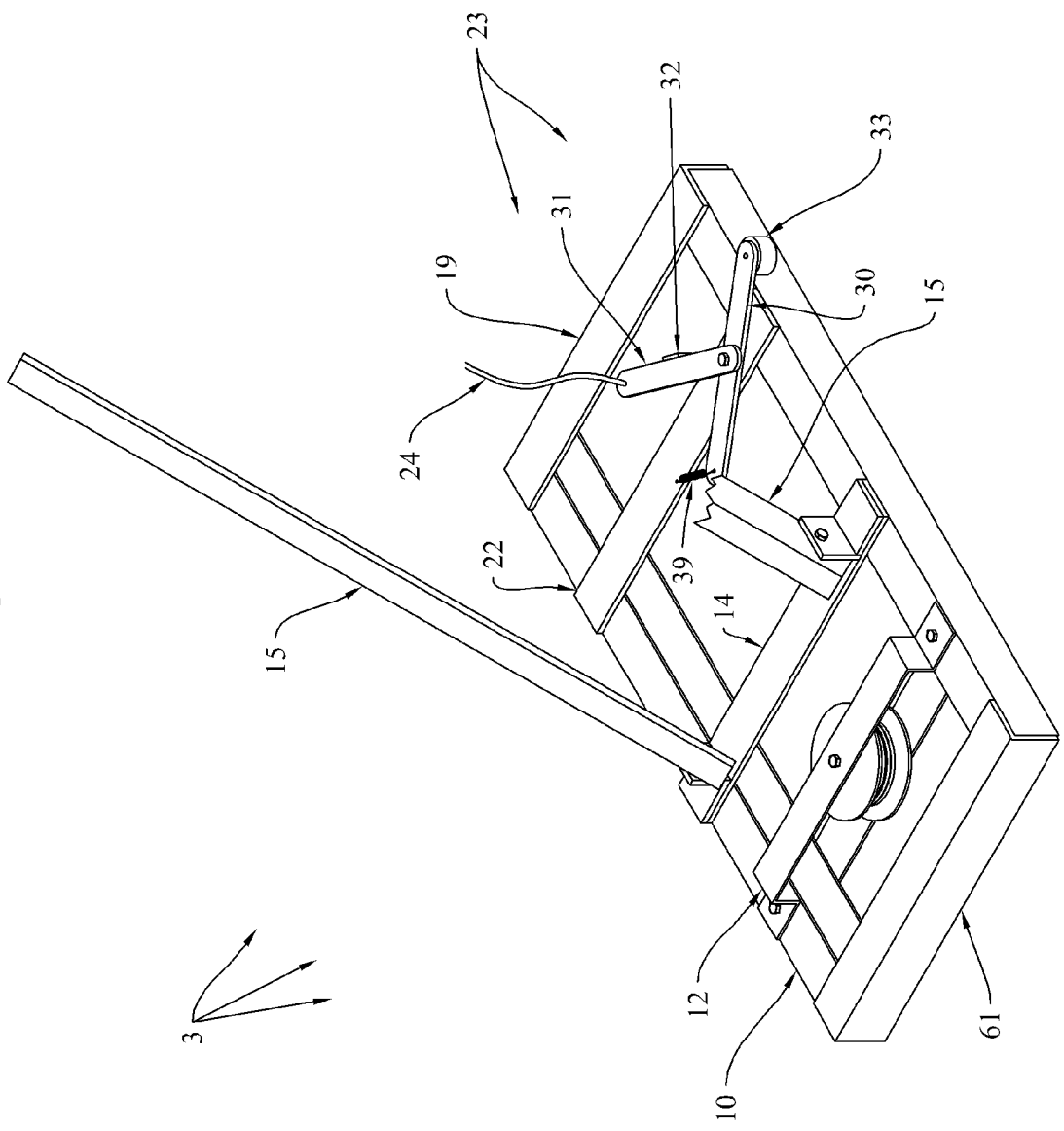
FIG. 5 is a partial perspective view of the dolly assembly depicting the triggering mechanism of the present invention.

FIG. 5 is a partial view of the dolly assembly 3 depicting the triggering mechanism 23. Pivotally attached to the fifth support bar 22 is first triggering linkage 30 and second triggering linkage 31. At a first end of the first triggering linkage 30 is a roller 33 and at the second end is an expansion spring 39 which is also attached to the fifth support bar 22. The expansion spring 39 keeps the first triggering linkage 30 and the roller 33 biased in an outward direction. As the dolly assembly 3 moves linearly along the dolly track 4, the roller 33 on the first triggering linkage 30 intersects one of the cutouts 26 or 27 in the position lever rail 25 thereby pivoting the first triggering linkage 30. As the first triggering linkage 30 pivots, a second end of the first triggering linkage 30 engages a tab 32 on the second triggering linkage 31 causing the second triggering linkage 31 to pivot causing the cable 24 that is attached at one end of the second triggering linkage 31 to move thereby activating the hooking mechanism 21 as will be described later.

Figure 6:
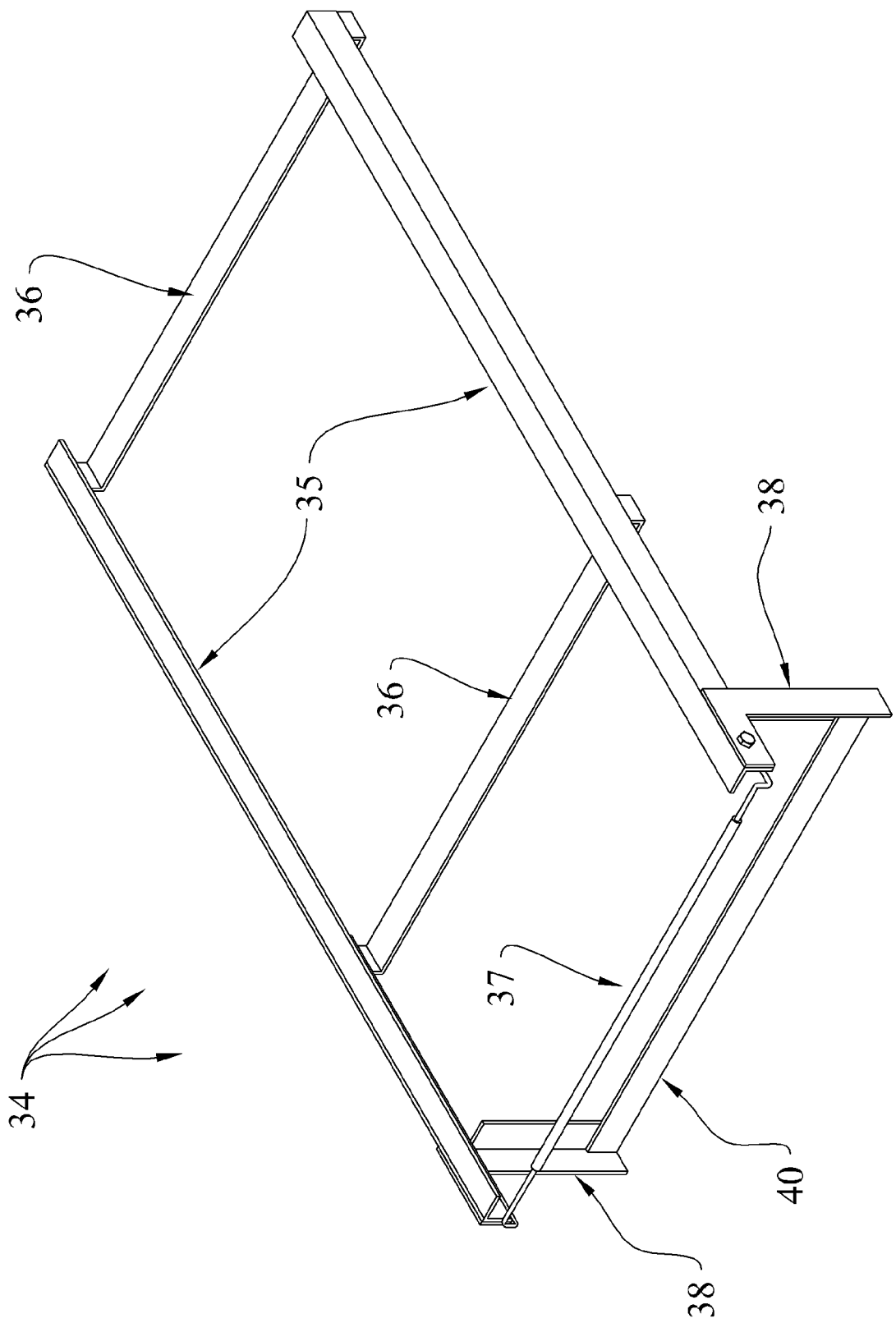
FIG. 6 is a perspective view of the bow cradle frame of the present invention.

FIG. 6 depicts the bow cradle frame 34 which consists of two bow cradle assembly rails 35 supported by two cross-member supports 36. There is a bow stop 37 adjustably mounted to a first end of the bow cradle assembly rails 35. Pivotably mounted to the first end of the bow cradle assembly rails 35 are two hook mechanism support bars 38. Longitudinally attached to the two hook mechanism support bars 38 is the hook mechanism slide bar 40.

Figure 7:
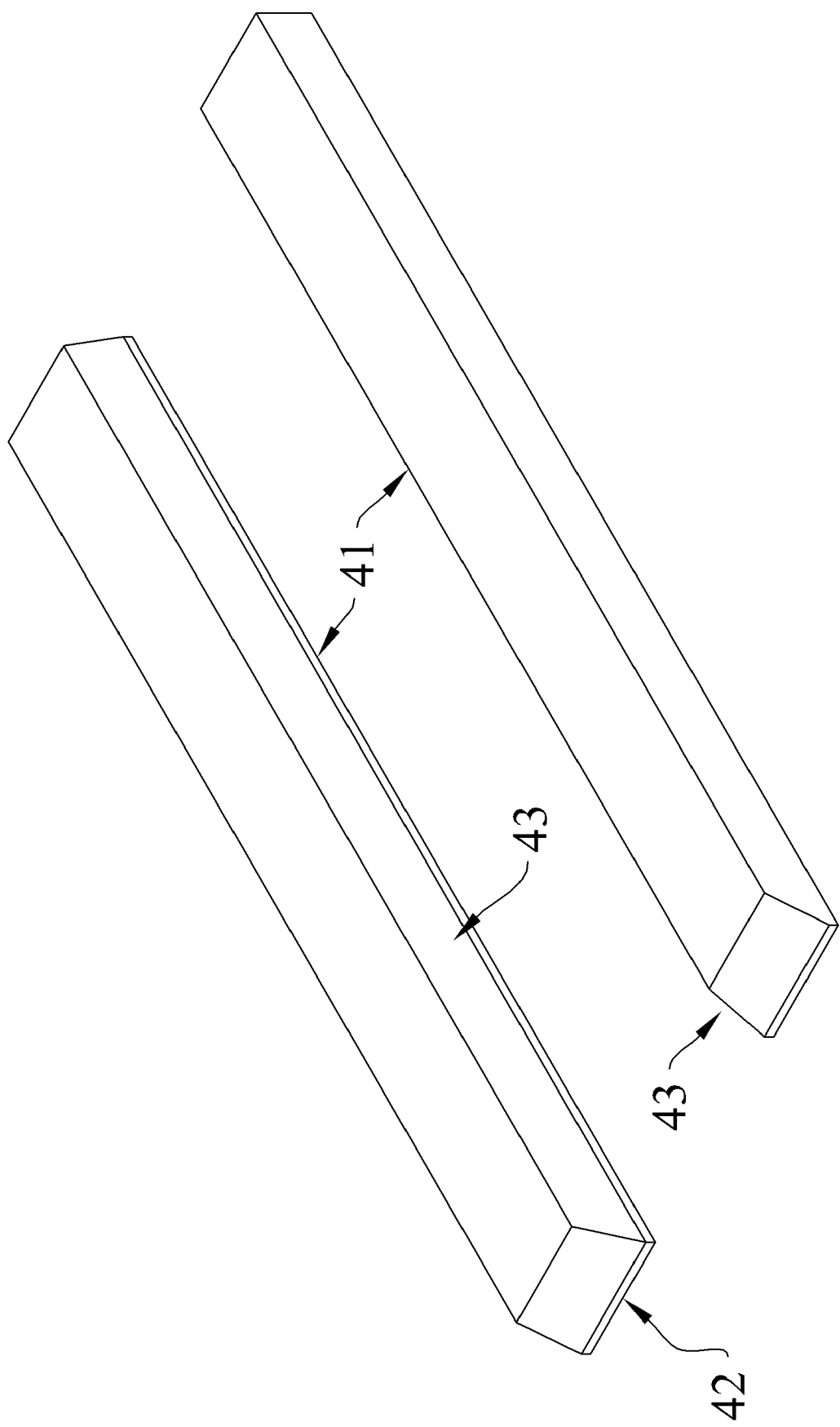
FIG. 7 is a perspective view of the bow cradle rests of the present invention.

FIG. 7 depicts the padded bow protector and alignment guides 41 which have the ends 42 and inside edges 43 tapered to accept the bow of a boat. The alignment guides 41 are mounted to the top of the cradle rails 35 shown in FIG. 8.

Figure 8:
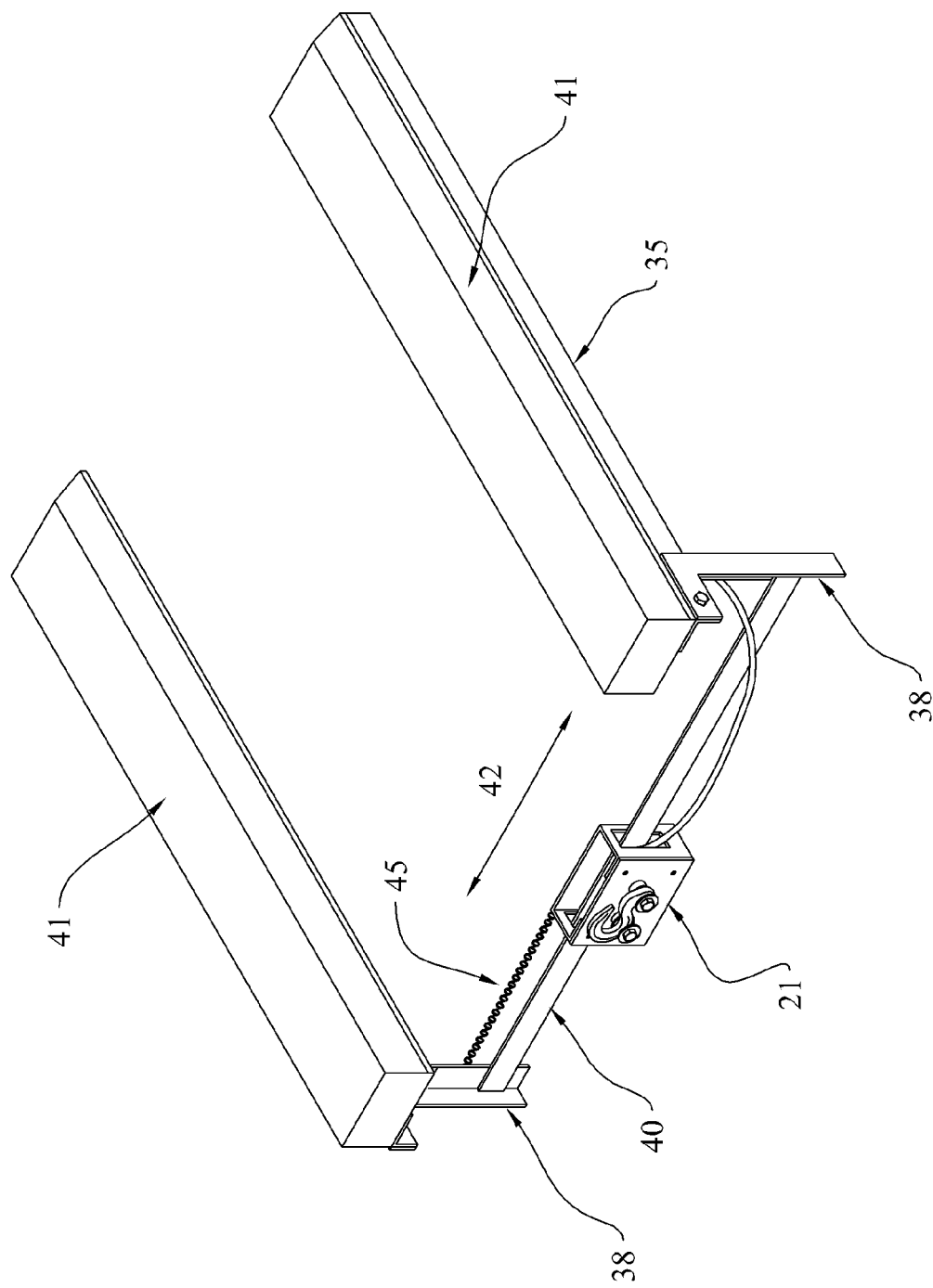
FIG. 8 is a side perspective view of the bow cradle frame rails with the attached cradle rests of the present invention.

FIG. 8 depicts the bow cradle assembly rails 35 with the attached alignment guides 41. Slideably attached to the hook mechanism slide bar 40 is the hooking mechanism 21. In use, the hooking mechanism 21 slides horizontally along the slide bar 40 as indicated by the arrow 42.

Figure 9:
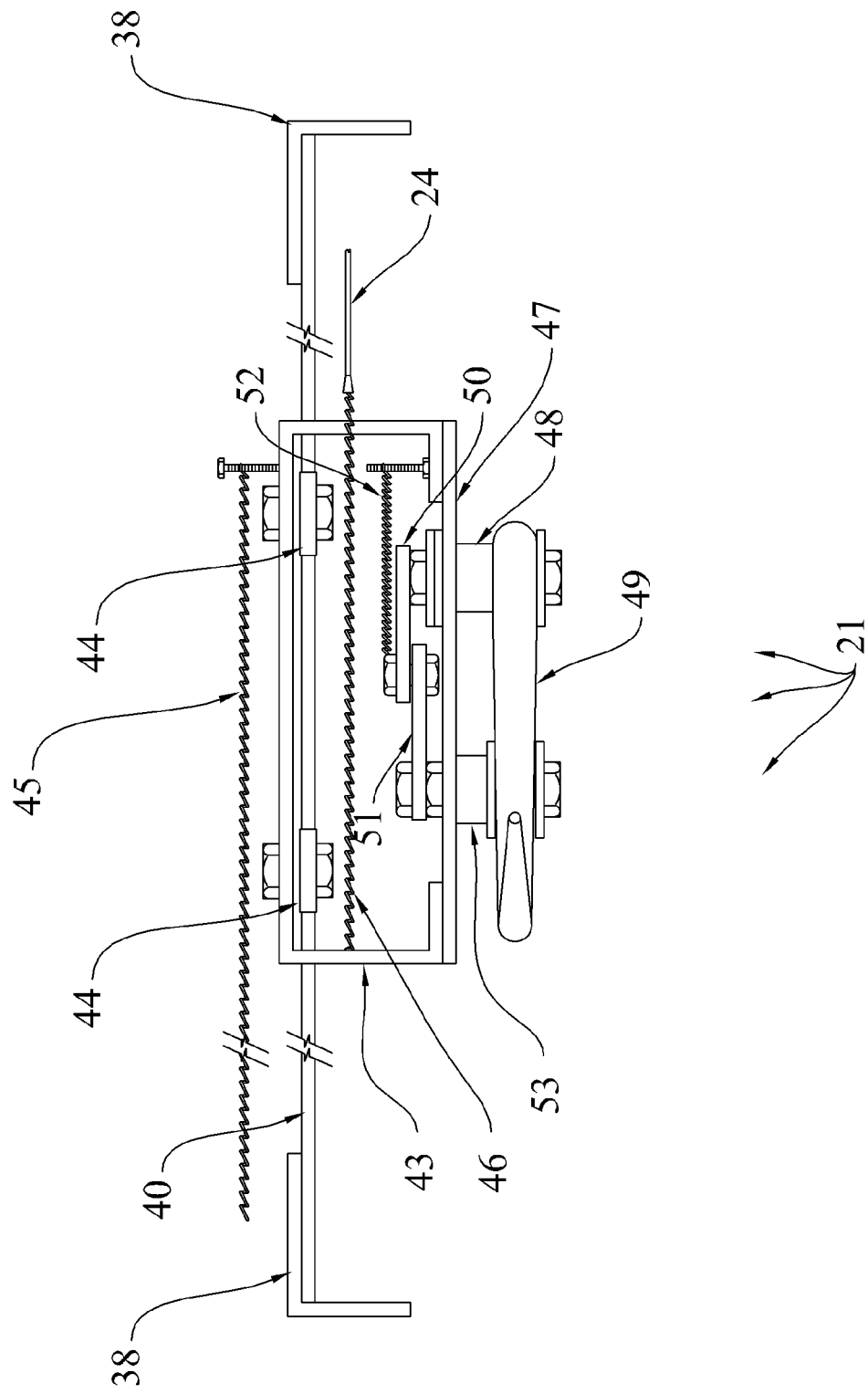
FIG. 9 is a planar top down end view of the hooking mechanism of the present invention.

FIG. 9 is a top down view of the hooking mechanism 21 slideably attached to the slide bar 40. The hooking mechanism includes a frame 43. Rotatably mounted to the frame are four (4) rollers 44 (only two of which are shown) that ride on the slide bar 40. Two of the rollers 44 ride on the top of the slide bar 40 and the other two rollers 44 ride on the bottom of the slide bar 40 thereby preventing the hooking mechanism from disengaging from the slide bar 40. Attached to the outside of the frame 43 is a first expansion spring 45 which is connected at one end to the hooking mechanism frame 43 and at the other end to one of the hook mechanism support bars 38 shown in FIG. 8. When not in use, the first expansion spring 45 maintains the hooking mechanism 21 in a position to the left side of the slide bar 40. The cable 24 that is attached at a first end to the second triggering linkage (as depicted in FIG. 5) is attached at a second end to a first end of a second expansion spring 46. The second end of the second expansion spring 46 is attached to the hooking mechanism frame 43.

Attached to the hooking mechanism frame 43 is a hook plate 47. Rotatably and slideably attached to the hook plate 47 is a pivot pin 48. At a first end of the pivot pin 48 is attached a boat hook 49 and at a second end is attached a first end of a first hook linkage bar 50. The boat hook 49 is normally biased towards the fixed pin 53 by an expansion spring (not shown). At the second end of the first hook linkage bar 50 is rotatably attached a first end of a second hook linkage bar 51. Also attached to the second end of the first hook linkage bar 50 is a third expansion spring 52 which is also attached to the hooking mechanism frame 43. The second end of the second hook linkage bar 51 is rotatably connected to a fixed pin 53 mounted in the hook plate 47.

Figure 10:
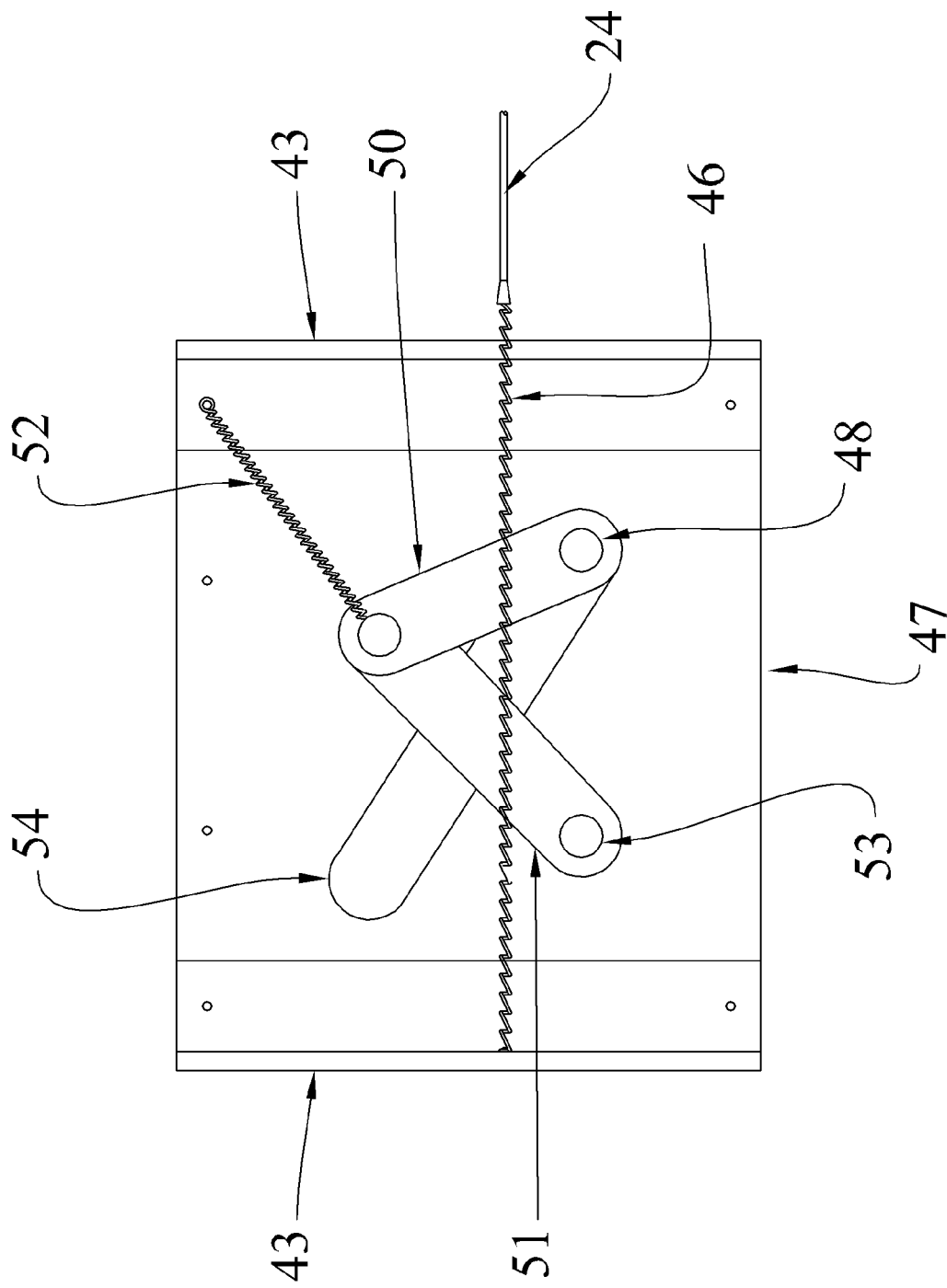
FIG. 10 is a planar inside view of the hook plate of the present invention.

FIG. 10 depicts the inside view of the hook plate 47 and hook linkage bars 50 and 51. The hook plate 47 is attached to the hooking mechanism frame 43. There is an angled through hole slot 54 cut out of the hook plate 47. The slideable and rotatable pin 48 rides in the slot 54. The first hook linkage bar 50 is attached to the slideable and rotatable pin 48 at one end and to a first end of the second hook linkage bar 51 at the other end. The third expansion spring 52 is attached to the second end of the first hook linkage bar 50 and to the frame 43. The third expansion spring 52 keeps the hook 49 in a normally open position ready to receive a bow ring of a watercraft. The second end of the second hook linkage bar 51 is rotatably attached to the pin 53. The cable 24 is attached to the second expansion spring 46 which is in turn attached to the hooking mechanism frame 43.

Figure 13:
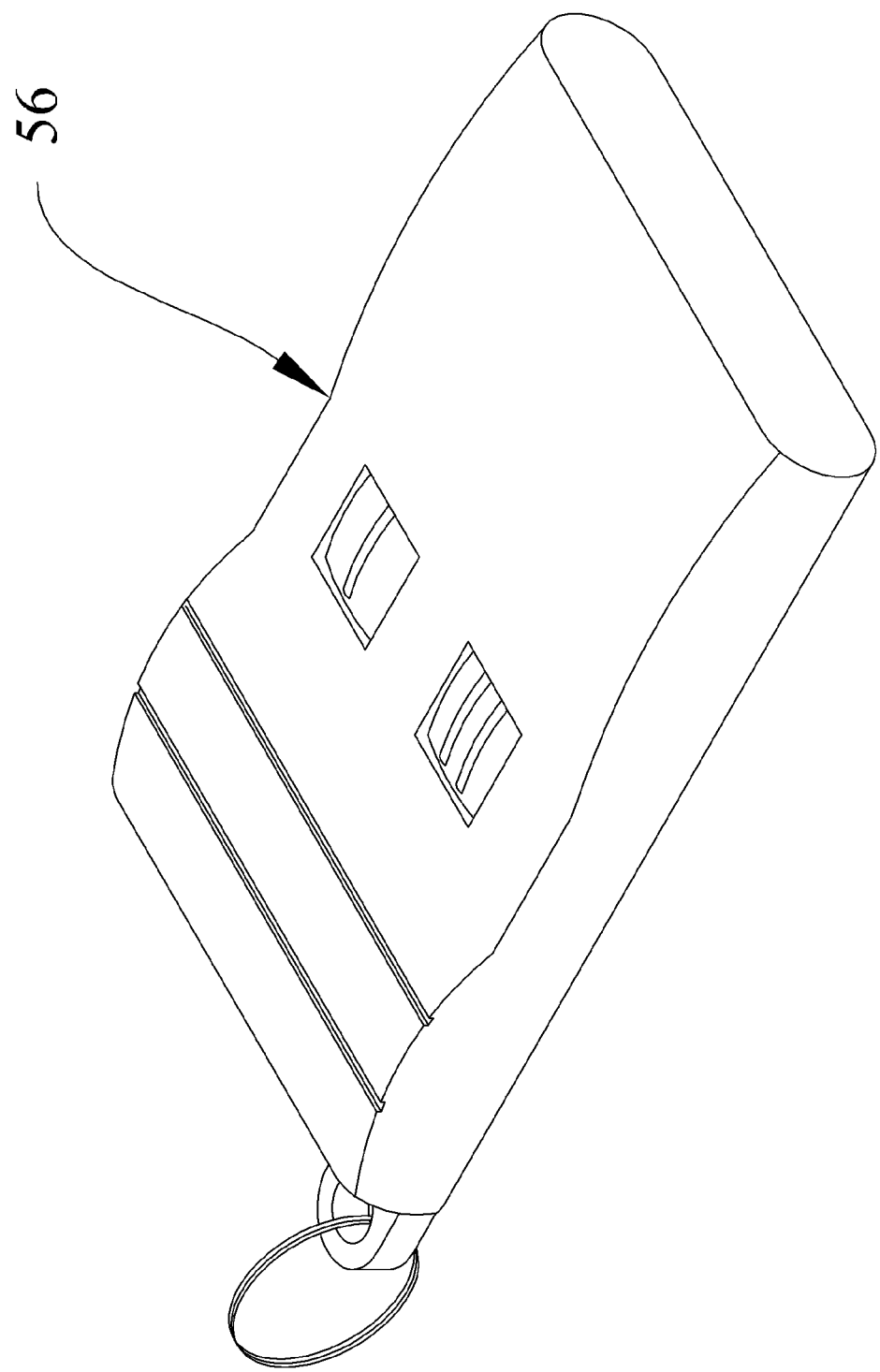
FIG. 13 is a perspective view of the key chain remote of the present invention.

To retrieve a watercraft, a user backs a watercraft trailer 2 down a ramp into the water. The user enters the watercraft and activates the key chain remote 56 (shown in FIG. 13) which releases the power winch 6 and strap 55 shown in FIGS. 1 and 2. The constant tensioner wheel 13 then pulls the dolly assembly 3 toward the rear of the trailer 2. When the triggering linkage roller 33 intersects the rear cutout 27, the hooking mechanism 21 stays to the right hand side as viewed from inside the boat which keeps the hook 49 in its normally open position. The user then drives the watercraft towards the dolly assembly 3 and the bow cradle assembly 20. As the watercraft enters the dolly assembly 3, the bow ring contacts the bow stop 37 and the watercraft pushes the dolly assembly 3 forward on the dolly track rails 4 until the triggering linkage roller 33 intersects with the forward cutout 26. This causes the triggering linkages 30 and 31 to move thereby causing the triggering cable 24 to move. As the cable 24 moves, it pulls on the second expansion spring 46 which pulls the hooking mechanism 21 to the left, when viewed from inside the boat, overcoming the force of the first expansion spring 45. When the bow hook 49 encounters the bow ring of a watercraft, the hooking mechanism 21 stops moving but the cable 24 continues to pull on the frame 43 causing the hook mechanism 21 to remain in place. Once the watercraft is located in the bow cradle assembly 20 and the hook 49 is aligned with the bow ring, the user activates the key chain remote 56 which engages the power winch 6.

Attached to the power winch 6 is the strap 55 (shown in FIG. 1) that is attached to the hook 49. When activated, the power winch 6 rewinds the strap 55 which pulls on the hook 49 which first pivots the hook mechanism support bars 38 and the attached hooking mechanism 21 to pull the hooking mechanism 21 in alignment with the bow ring of a watercraft and then slides the hook 49 in the slot 54 in the hook plate 47 causing the hook 49 to rotate and fully engage the bow ring of a water craft. Continued operation of the power winch 6 causes the watercraft to align itself with the boat trailer 2 and causes the boat and dolly assembly 3 to move up onto the boat trailer 2 in a fully loaded position. There is an automatic power winch cutoff switch 8 mounted on the post arm 5 shown in FIGS. 1 and 2. When the bow stop 37, shown in FIG. 6, encounters the cutoff switch 8, the power to the power winch 6 is terminated and the watercraft is fully loaded and secured. The trailed watercraft and trailer 2 can then be pulled out of the water by a vehicle.

Figure 11:
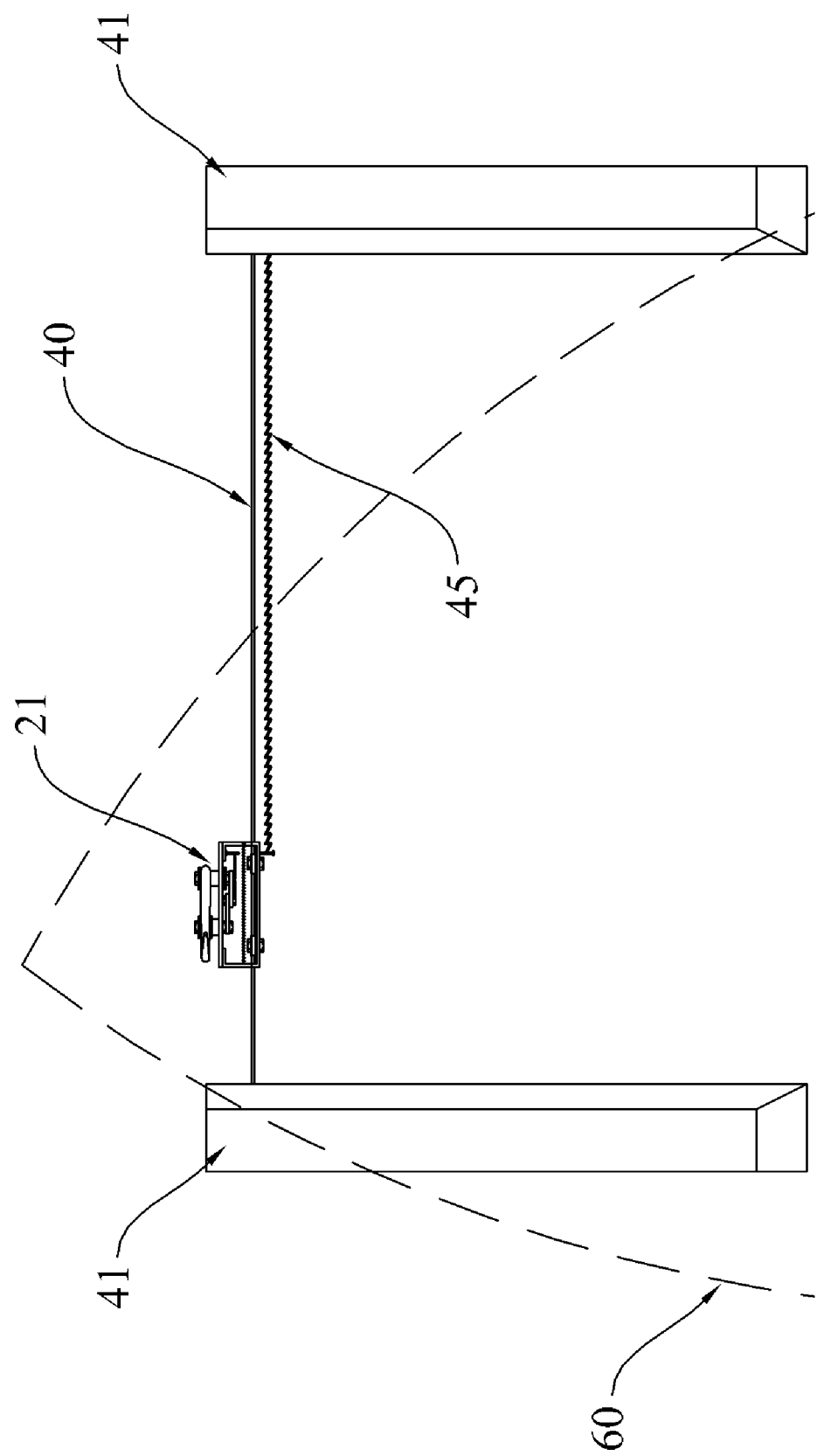
FIG. 11 is a top planar view of the bow cradle with the bow of a boat in misalignment to the left side of the present invention.
Figure 12:
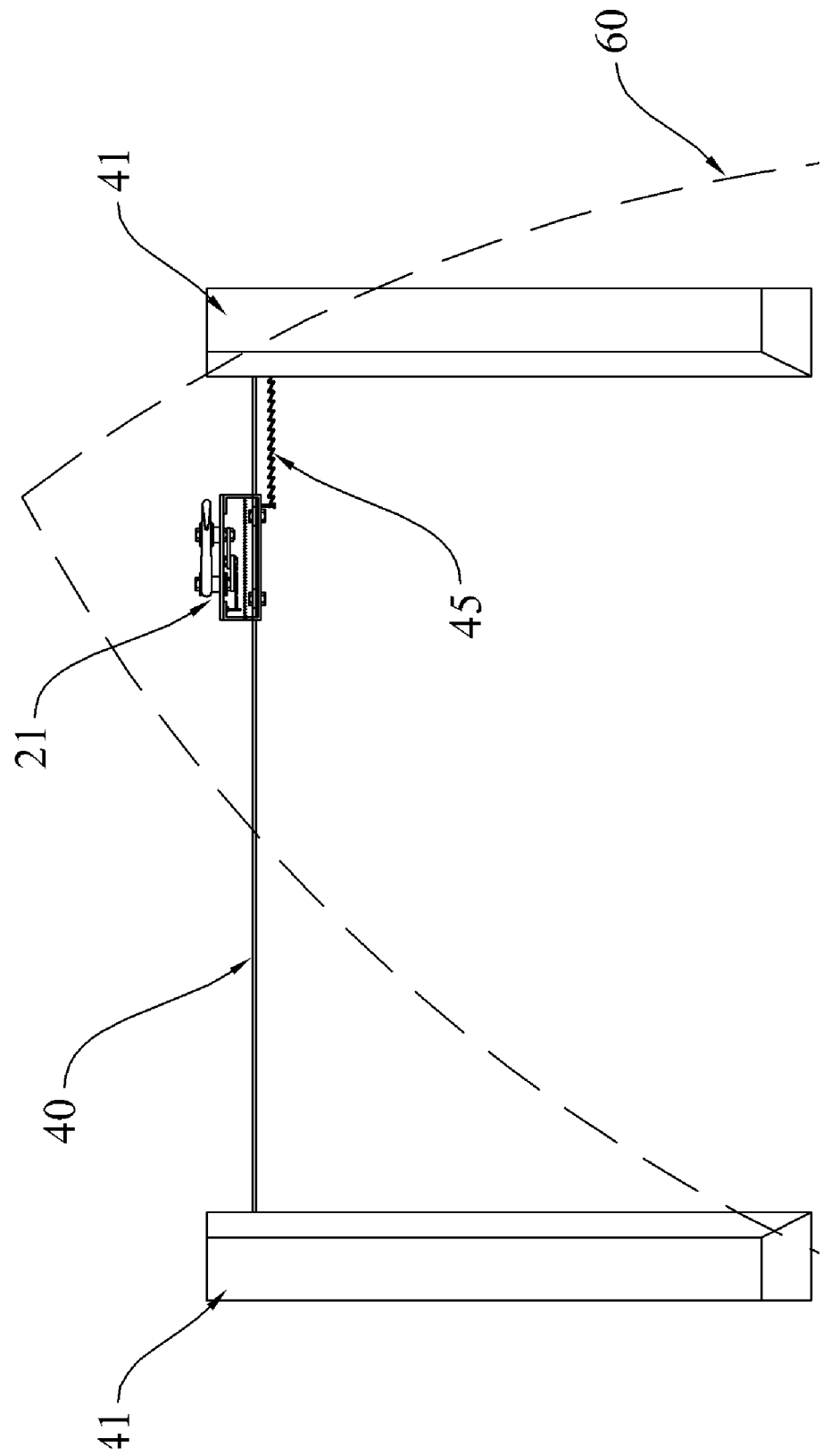
FIG. 12 is a top planar view of the bow cradle with the bow of a boat in misalignment to the right side of the present invention.

As depicted in FIGS. 11 and 12, and from the description and attached drawings of the bow cradle assembly 20 and the hooking mechanism 21, the present invention provides for a wide degree of initial misalignment of a watercraft to the bow cradle rests 41 as the hooking mechanism 21 has a full range of movement on the slide bar 40 between the bow cradle assembly rails 35. FIG. 11 depicts a boat bow 60 in phantom lines approaching the alignment guides 41 at a sharp left angle to the alignment guides 41. The hooking mechanism 21 has traversed across the slide bar 40 to its far left position in order to engage the bow ring (not shown). FIG. 12 depicts a boat bow 60 in phantom lines approaching the alignment guides 41 at a sharp right angle to the alignment guides 41. When viewed from inside the boat, the hooking mechanism 21 is in it far right position on the slide bar 40 in order to engage the bow ring (not shown). This design enables a single user to approach the dolly assembly 3 with less than perfect alignment and still easily and conveniently engage the hooking mechanism 21 to secure the watercraft to the trailer 2. The amount of misalignment a watercraft can have with the centerline of the trailer 2, and still be effectively engaged by the sliding hooking mechanism 21, is determined by the width of the bow cradle frame 34 and the length of the mechanism slide bar 40 which is determined by the hull design width of the chosen watercraft. Other types of springs or triggering mechanisms could be substituted for those presented above in order to effectuate the operation of this invention without deviating from the present invention.

To launch a watercraft, a user backs the trailer 2, with attached watercraft, down a ramp and into the water. The watercraft then begins to float on the water while the trailer 2 sinks. The user then enters the watercraft and activates the key chain remote 56 which releases the power winch strap 55. Released from the tension of the power winch, the constant tensioner cable wheel 13 pulls the dolly assembly 3 toward the rear of the trailer 2. When the triggering linkage roller 33 intersects the rear cutout 27 on the position lever rail 25, the triggering linkages 30 and 31 move thereby causing the cable 24 to move which allows the first expansion spring 45 to pull the hooking mechanism 21 to the right which causes the hook 49 to return to its normally open position thereby releasing the bow ring of a watercraft from the hooking mechanism 21.

To anyone skilled in the art, the fundamental precepts and arrangement of the foregoing invention could be easily adapted to the loading and unloading of numerous items onto trailers or trucks, such as but not limited to, four wheel ATV's, tractors, forklifts, dozers, backhoes, loaded pallet skids, crates and the like without departing for the scope and intent of the invention. All that is required is a ramp with a slidable dolly attached to the ramp along with the remainder of the present invention.

I claim:

1. A watercraft trailer, comprising:
   a watercraft support having a front end, a rear end and a plurality of trailer wheels disposed proximate said rear end;
   a trailer hitch disposed on the front end of said watercraft support for releasably securing said trailer to a tow vehicle;
   a post arm fixedly attached proximate said front end of said watercraft support, said post arm having a remotely controlled power winch, a power winch cutoff switch and watercraft bow support rollers attached thereto;
   a key chain remote to operate said winch;
   first and second dolly track rails fixedly attached to said watercraft support;
   a track strut fixedly attached to the rear end of said first and second dolly track rails;
   a position lever rail fixedly attached to the top of said first dolly track rail, said position lever rail having first and second cutouts; and
   a dolly assembly moveably positioned in said dolly track rails, said dolly assembly comprising:
   a. a first and second dolly frame rail to which are rotatably attached a plurality of dolly guide wheels, said guide wheels rotatably and moveably contained in said dolly track rails;
   b. a rear end support bar attached to the first ends of said first and second dolly frame rails;
   c. a first support bar fixedly attached proximate said first ends of said first and second dolly frame rails;
   d. a constant force cable tensioner attached to said first support bar, the cable of said constant force cable tensioner being attached at first end to said cable tensioner and at a second end to said track strut;
   e. a second support bar fixedly attached proximate the longitudinal center of said dolly frame rails;
   f. a first and second cradle frame rails pivotally mounted at a first end to said second support bar, one cradle frame rail mounted proximate each end of said second support bar;
   g. a third and fourth support bars fixedly mounted to said first and second cradle frame rails;
   h. a first and second air shocks mounted at a first end proximate the second end of said cradle frame rails and at a second end to the front end support bar, said front end support bar fixedly attached to a second end of said dolly frame rails;
   i. a fifth support bar fixedly mounted to said dolly frame rails between said second support bar and said front end support bar;
   j. a spring biased triggering mechanism for activating and deactivating a hooking mechanism; and
   k. a bow cradle assembly pivotably mounted to said second ends of said cradle frame rails, said cradle frame assembly comprising:
      1. two bow cradle assembly rails connected by two cross member supports;
      2. two bow protector and alignment guides attached to said bow cradle assembly rails;
      3. a bow stop adjustably mounted to said bow cradle assembly rails;
      4. two hook mechanism support bars pivotably mounted to said bow cradle assembly rails;
      5. a hook mechanism slide bar fixedly attached to said hook mechanism support bars; and
      6. a hook mechanism slidable attached to said hook mechanism slide bar, said hook mechanism comprising:
         a. a hook frame;
         b. four rotatable rollers which ride on said hook mechanism slide bar;
         c. a first spring which is attached at a first end to said hook frame and at a second end to said hook mechanism support bars;
         d. a second spring which is attached at a first end to the second end of said triggering mechanism cable and at a second end to said hook frame;
         e. a hook plate is fixedly attached to said hook frame, said hook plate having an angled through-hole slot;
         f. a first pivot pin rotatably and slideably mounted in said slot;
         g. attached to said first pivot pin on a first end is a watercraft hook and on a second end is a rotatable first end of a first linkage bar;
         h. attached to the second end of said first linkage bar is a first end of a second linkage bar;
         i. the second end of said second linkage bar is rotatably attached to a first end of a second pivot pin;
         j. a hook rest is attached to the second end of said second pivot pin;
         k. a third spring is attached at a first end to said second end of said first linkage bar and at a second end to said hook frame; and
         l. a fourth spring is wrapped around said hook rest and attached at both ends to said hook.

2. The trailer according to claim 1, wherein said spring biasing triggering mechanism comprises:
   a first triggering mechanism linkage bar pivotably mounted to said fifth support bar;
   a roller for engaging said position lever rail mounted to a first end of said first triggering mechanism linkage bar;
   a spring attached at a first end to the second end of said first triggering mechanism linkage bar and at a second end to said fifth support bar;
   a second triggering mechanism linkage bar pivotably attached at a first end to said second end of said first triggering mechanism linkage bar and to said fifth support bar; and
   said triggering mechanism cable being attached to the second end of said second triggering mechanism linkage bar, said second triggering mechanism linkage bar having a protruding tab for selective engagement with said first triggering mechanism linkage bar.

3. The trailer according to claim 1, wherein said spring biasing triggering mechanism has a horizontal movement range equal to the distance between said bow cradle rails to accommodate retrieving a watercraft bow that is off-center to said post.

4. A watercraft trailer, comprising:
   a watercraft support having a front end, a rear end and a plurality of trailer wheels disposed proximate said rear end;
   a trailer hitch disposed on the front end of said watercraft support for releasably securing said trailer to a tow vehicle;

a post arm fixedly attached proximate said front end of said watercraft support, said post arm having a remotely controlled power winch, a power winch cutoff switch and watercraft bow support rollers attached thereto;

a key chain remote to operate said winch;

first and second dolly track rails disposed linearly along said watercraft support;

a rear track strut fixedly attached to the rear end of said first and second dolly track rails;

a position lever rail fixedly attached to the top of said first dolly track rail, said position lever rail having first and second cutouts; and a dolly assembly movably disposed along said dolly track rails, said dolly assembly being spring biased in a rearward direction and having a pivotably bow cradle assembly mounted to the top of said dolly assembly and a spring biased triggering mechanism in contact with said position lever rail, said bow cradle assembly having bow protectors and a spring biased hooking mechanism pivotally and slideably attached to said bow cradle assembly, and said spring biased hooking mechanism have a spring biased bow hook rotatably and slidable attached to said hooking mechanism with a spring biased cable attached to said hooking mechanism at a first end and at a second end to said triggering mechanism.

5. The trailer according to claim 4, wherein said spring biasing triggering mechanism has a horizontal movement range equal to the distance between said bow cradle rails to accommodate retrieving a watercraft bow that is off-center to said post.

\* \* \* \* \*